United States Patent [19]

Paule et al.

[11] 4,392,093
[45] Jul. 5, 1983

[54] ELECTRONIC CONTROL AND REGULATING SYSTEM

[75] Inventors: Kurt Paule, Stuttgart; Fritz Schädlich; Martin Gerschner, both of Leinfelden-Echterdingen; Friedrich Hornung, Stuttgart, all of Fed. Rep. of Germany

[73] Assignee: Robert Bosch GmbH, Stuttgart, Fed. Rep. of Germany

[21] Appl. No.: 233,587

[22] PCT Filed: Jun. 28, 1980

[86] PCT No.: PCT/EP80/00038
§ 371 Date: Jun. 4, 1981
§ 102(e) Date: Jan. 27, 1981

[87] PCT Pub. No.: WO81/01085
PCT Pub. Date: Apr. 16, 1981

[30] Foreign Application Priority Data
Oct. 4, 1979 [DE] Fed. Rep. of Germany ....... 2940195

[51] Int. Cl.³ .............................................. H02K 23/64
[52] U.S. Cl. ................................ 318/245; 318/345 D; 318/345 H
[58] Field of Search .............. 318/245, 345 D, 345 A, 318/345 H, 493, 439, 254

[56] References Cited
FOREIGN PATENT DOCUMENTS

| 1588323 | 7/1969 | Fed. Rep. of Germany . |
| 1588354 | 9/1969 | Fed. Rep. of Germany . |
| 1309684 | 3/1962 | France . |
| 2126350 | 4/1972 | France . |
| 485273 | 6/1970 | Switzerland . |

*Primary Examiner*—Ulysses Weldon
*Attorney, Agent, or Firm*—Frishauf, Holtz, Goodman & Woodward

[57] ABSTRACT

An electronic control and regulating system for AC-operated appliances, especially universal motors and with symmetrical phase control. The control circuit includes among other things an inductive current-voltage converter 9, the primary side 8 of which is connected to the load current circuit and in which, in addition to the converter function, the inductivity of the secondary winding 10 is used and becomes a component of a resonant circuit 20 which is tuned approximately to the frequency of the AC voltage source. The feedback variable of the control system is formed by the resonant circuit voltage, i.e. the resonant circuit impedance, which depends not only on the magnitude of the load current but also on the phase angle of the load current. This quasi-resonance effect makes possible a direct influence of the trigger circuit which consists customarily of a trigger capacitor 13, a load resistor 11 and a trigger diode 15 and is possible without excessive use of additional circuit elements.

10 Claims, 6 Drawing Figures

ELECTRONIC CONTROL AND REGULATING SYSTEM

The present invention relates to an electronic control system defined by the category of the main claim, and more particularly to speed control of universal motors connected to a a-c power grid, for example fo A-C operated appliances.

BACKGROUND

Several phase control and/or regulating systems are known. In many cases these are merely control systems in which a particular speed is set in a trigger circuit by setting of a time constant.

Rotary speed control systems may use a tacho-generator coupled to the motor from which an electrical signal for the actual speed value is derived. Such a control system has the disadvantage of being relatively slow because as a rule the mechanical time constant of the motor is part of the control process or the stabilizing process. The control circuits of full wave control systems for universal motors without tacho-generators are still relatively expensive because either the entire control circuit must be a DC circuit or at least the feedback signal must be rectified and/or the feedback signal is fed to active semiconductor elements for amplification and for the processing.

THE INVENTION

It is an object to improve the control circuit for a speed control system, particularly for universal motors connected to an A-C network.

Briefly, the motor is serially connected with a semiconductor switch, typically a triac which, additionally, is serially connected with a current/voltage converter or transformer. The current/voltage converter or transformer has its secondary, forming the voltage winding, connected to a capacitor to form a resonance circuit. The resonance frequency of the capacitor/inductance circuit is so arranged that it is between 0.5 to 1 times the power network frequency, preferably in the vicinity of the power network frequency. The resonance circuit is connected to the trigger circuit for the triac. The triac trigger circuit includes a charge capacitor, the charge on which is modified by the voltage occurring within the resonance circuit, so that the phase angle control effected upon triggering or firing of the triac, is controlled not only by the charge on the trigger capacitor but, additionally, by a factor dependent on current flow in the resonance circuit.

The resonance circuit becomes more and more effective, that is, its impedance increases with increasing current angle of the load current, and directly affects the charging of the trigger capacitor, and hence triggering of the trigger circuit. In contrast with prior inductive converters in control systems, the inductivity of the secondary winding of the converter is used to form a resonant or oscillatory circuit together with the parallel capacitor, the frequency of the resonance circuit being in the vicinity of the network frequency with which the system is to be used. Speed control can be obtained in accordance with a feature of the invention by a potentiometer which is connected to simultaneously influence the firing of triggering of the trigger circuit and the damping of the resonance circuit. The number of primary and secondary turns can be suitably selected to adapt or match the system readily to the particular load expected, as well as to the characteristics of the components in the trigger circuit, for example the breakdown voltage of a triggering diode connected in the firing circuit of the triac. The speed controller according to the present invention has the advantage of being a symmetrical full wave A-C controller in which the feedback signal necessary for control is firstly derived as a pure AC-value and secondly is fed back to the trigger circuit with sufficient amplitude and correct phase. It increases in higher-than-proportional ratio, i.e. amplifies in accordance with the load of the appliance. This is particularly advantageous since then the control system of the invention has only small deviations from a controlled value.

Only a small number of elements is required, resulting in space and cost savings. The symmetrical, full-wave operation leads to a low level of spurious noise signal generation supplied to the power supply grid or network. The controller, being a two-terminal unit, may be inserted in series with the load and the voltage source at any desired point. Speed can be arbitrarily controlled by a potentiometer setting.

DRAWING

Five exemplary embodiments of the invention are represented in the drawing and are described in more detail in the subsequent description.

DESCRIPTION OF THE EXEMPLARY EMBODIMENTS

Figure 1:
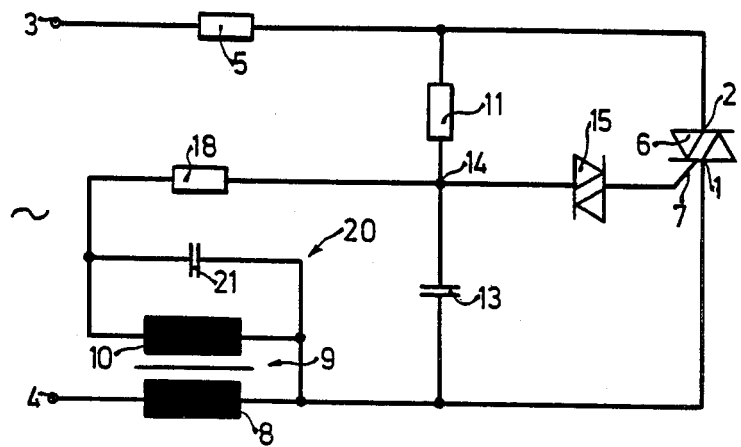
FIG. 1 shows a schematic diagram of a control circuit as the principal circuitry for a motor operated with alternating current.

FIG. 1 shows a load 5, for example a universal motor, in series with a Triac 6 and the primary winding 8 of an inductive current/voltage converter 9, all connected between the terminals 3 and 4 of an AC current supply grid. Connected in parallel with the main contacts 2, 1 of the Triac 6 is the series connection of a charging resistor 11 and a trigger capacitor 13 whose junction point 14 is connected via a trigger diode 15 to the control electrode 16 of the Triac 6. Connected in parallel with the trigger capacitor 13 is the series connection of a decoupling resistor 18 and a parallel resonant circuit 20, formed by a capacitor 21 and the secondary winding 8 of the current/voltage converter 9. The oscillation circuit 20 is designed for a resonant frequency of 0.5–1.0 times grid frequency. The charging resistor 11 and the trigger capacitor 13, together with the trigger diode 15 form a trigger circuit for Triac 6 which, as such, is known.

Operation

The trigger pulse is derived from the grid voltage by charging the trigger capacitor 13 with alternating potential via the resistor 11 until the instantaneous value of the capacitor voltage at the trigger capacitor 13 is equal to the characteristic breakdown voltage of the trigger diode 15. Thereafter, the trigger capacitor 13 discharges very rapidly through the trigger diode 15 and the control electrode 7, thereby firing the Triac 6. In principle, the charging rate of the trigger capacitor 13, i.e. the time during each half period until the firing voltage of the trigger diode 15 has been reached and the Triac 6 becomes conducting, depends on the setting of the charging resistor 11. Thus, this resistor permits the presetting of a particular value of the motor speed.

The peculiarity of the circuit illustrated in FIG. 1 is that the current/voltage converter 9, together with the capacitor 21 form a characteristic parallel resonant circuit 20 whose resonance behavior is utilized in the invention. The secondary winding 10 has a large number of turns and represents the inductivity of the oscillating circuit 20. The primary winding 8 has only a few turns and represents the feedback winding of the resonant circuit 20. This latter winding is connected in the load circuit and the Triac 6 alone supplies the feedback amplification via the load current. The resonance frequency of oscillatory circuit 20 is 0.5–1.0 times the grid frequency.

Figure 2:
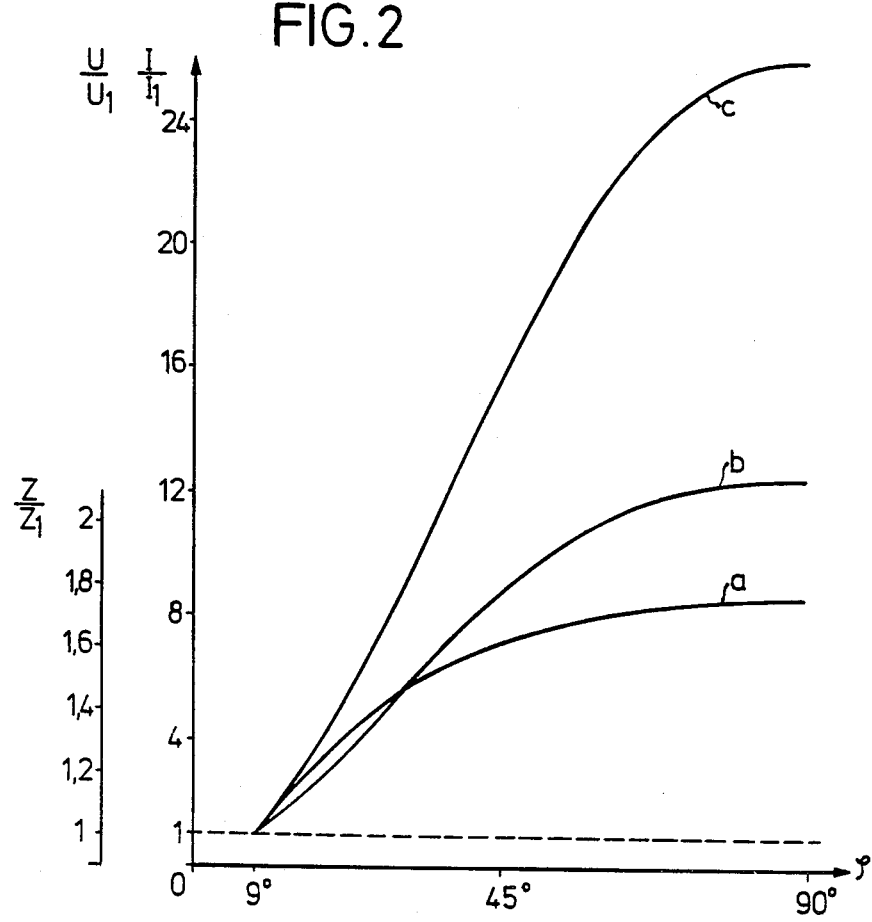
FIG. 2 is a diagram for illustrating the function of the control circuit of FIG. 1.

When the load on the motor and the effective current increase and the current phase angle increases via the feedback branch, then the resonant circuit 20 generates a quasi-resonance effect, namely, although the basic frequency (grid frequency) is not changed, the impedance of the resonant circuit 20 increases and the voltage in the resonant circuit increases at a greater-than-proportional rate with respect to the effective value of the exciter current passing through the primary winding 8. This situation is illustrated in FIG. 2. Curve a shows the impedance Z as a function of the current phase angle, the curve/labeled b shows the exciter current I passing through the primary winding 8 and being equal to the load current and curve c illustrates the resonant circuit voltage U of the secondary winding 10. All curves are normalized to the initial value of the current flow angle of $\phi=9°$. This value of $\phi$ corresponds to an interval of 1 ms at a grid frequency of 50 Hz. As seen in FIG. 2, the impedance then increases by a factor of 1.75 when the current angle increases to $\phi=90°$ while the resonant voltage increases at roughly twice the rate of the associated exciter current, even though the basic frequency does not change. This resonance-like behavior is due only to the fact that the spectral amplitude distribution of the fundamental frequency and the harmonics of the tapped exciter current varies in dependence of the current angle. As the maximum of the oscillator voltage lags with respect to the firing time, the trigger circuit can be controlled by the oscillator voltage in the subsequent half wave. The increasing impedance, or the increasing oscillator voltage influences the trigger circuit via the coupling resistor 18 in such a way that the trigger capacitor 13 is charged with an increased or additional alternating current that is synchronous with the grid frequency. Therefore, the trigger diode 15 reaches its breakdown voltage sooner, thereby increasing the current angle which opposes the decreasing motor speed. This event immediately causes a further increase of the impedance or the oscillator voltage. By choosing suitable dimensions of the parallel resonant circuit 20 or the transformer ratio of the inductive current/voltage converter 9, one can obtain a high loop amplification factor and a low degree of control deviation. The resistor 18 decouples the oscillator circuit 20 from the trigger circuit. Without this decoupling resistor 18, no first firing would take place.

Figure 3:
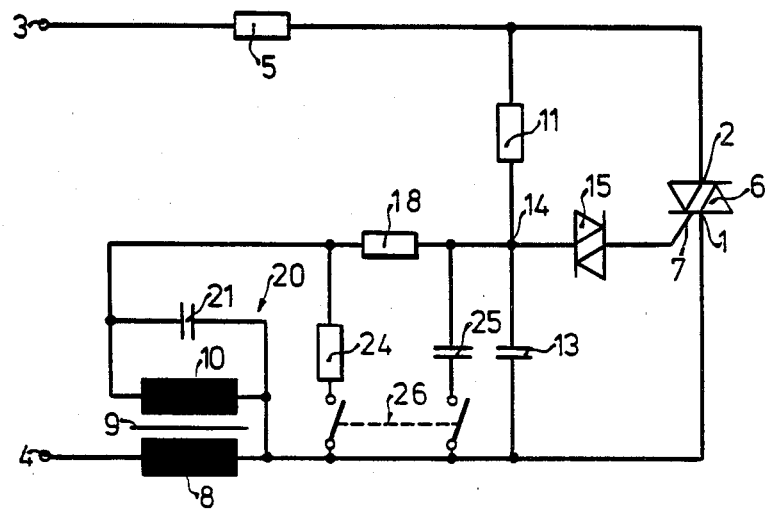
FIG. 3 illustrates a development of the control circuit of FIG. 1 including the possibility of RPM changes.

The second embodiment shown in FIG. 3 differs from the principal circuit of FIG. 1 in that it contains a circuit capable of changing the motor speed. In the following description, identical elements have the same reference numerals and are not described again.

In order to perform speed changes, a further capacitor 25 may be switched in parallel with the trigger capacitor 13 so as to increase the time constant of the trigger circuit as known by itself. In this way, the breakdown voltage of the trigger diode 15 is reached at a later time and thus the current angle is reduced. The switchover occurs via a two-pole switch 26 which also switches a resistor 24 parallel to the oscillator circuit 20. The resistor 24 dampens the resonant circuit 20 because, when the current phase angle is reduced, the resonant circuit voltage required for full activation of the trigger circuit should be reached only at a later point, i.e. at greater loads. Without the presence of the resistor 24, oscillations in the control loop can occur.

Figure 4:
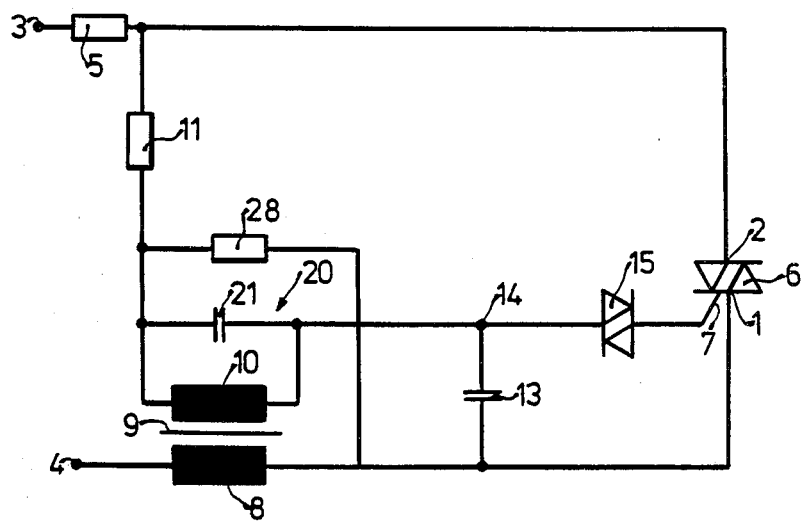
FIG. 4 is the circuit diagram of a third exemplary embodiment.

In the embodiment shown in FIG. 4, the charge resistor 11 in series with a resistor 28 is connected in parallel with the Triac 6. Connected to the junction of these resistors and the control electrode 7 of the Triac 6 is the parallel resonant circuit 20 in series with the trigger diode 15. The trigger capacitor 13 is connected as in FIG. 1 between the point 14 and a main connection 1 of the Triac 6. The load 5, the Triac 6, and the primary winding 8 are connected in series and lie between the contacts 3 and 4 of the AC current supply grid. Whereas the currents coming from the AC grid and the resonant circuit 20 and arriving at the trigger capacitor 13 are subtracted in the embodiment of FIG. 1, in the present case according to FIG. 4, one obtains a partial voltage from the AC grid at the voltage divider formed by the charge resistor 11 and the resistor 28 and the voltage of the resonant circuit 20 is added or subtracted to this partial voltage. The remaining function of the circuit corresponds in principle to that of FIG. 1.

Figure 5:
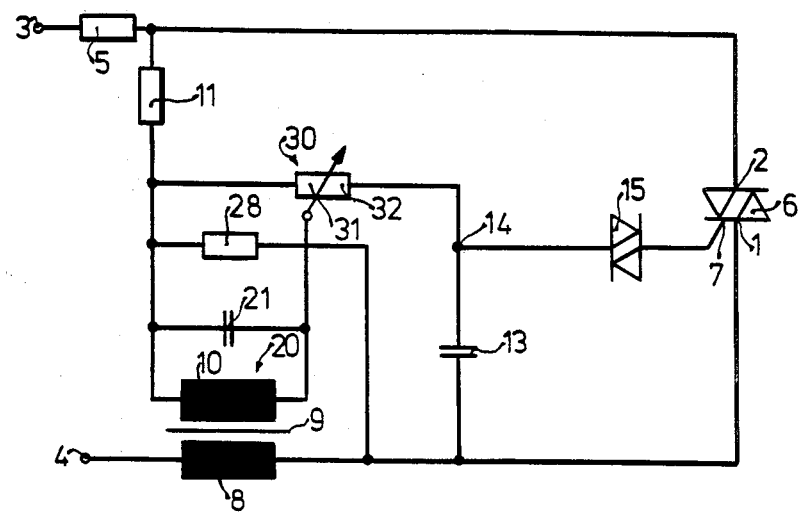
FIG. 5 is a further development of the circuit of FIG. 4 including stepless RPM changes.

A stepless speed adjustment can be performed within wide limits if the circuit of FIG. 4 is complemented by a potentiometer 30 as shown in FIG. 5. The potentiometer 30 is connected between the common junction of the load resistor 11, the resistor 28 and the resonant circuit 20 on the one hand and the point 14 on the other hand, the center tap being connected with the other connection of the resonant circuit 20. In this way, the time constant of the trigger circuit and the damping of the resonant circuit 20 may be influenced at the same time.

Operation, circuit of FIG. 5:

When the potentiometer is set with its partial resistance 32 equal to zero, i.e. with its partial resistance 31 at maximum, the circuit shown in FIG. 5 is identical to the embodiment of FIG. 4, neglecting the minimum damping of the resonant circuit 20 by the partial resistance 31. This position corresponds to the highest available speed. If the potentiometer 30 is adjusted for example so that both partial resistors 31, 32 are equal, the partial resistance 32 increases the time constant of the trigger circuit and the partial resistance 31 increases the damping of the oscillator circuit. This setting corresponds to a medium speed. If the potentiometer is set so that its partial resistance 32 is maximum and its partial resistance 31 is equal to zero, the time constant is so great that no firing of the Triac 6 takes place and the resonant circuit 20 is short-circuited.

Figure 6:
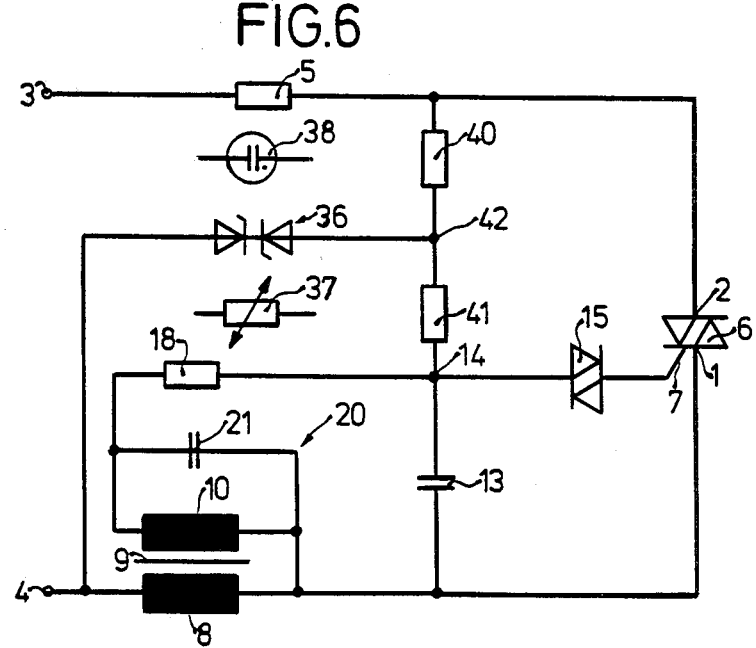
FIG. 6 illustrates a further embodiment of the invention.

The embodiment shown in FIG. 6 is a further development of the system according to FIG. 1. The place of the charge resistor 11 is taken by the series connection of two resistors 40, 41 to the junction 42 of which are connected two reversely solarized series connected Zener-diodes 36 which are connected to the terminal 4. The series connection of the Zener-diodes 36 may be replaced by a gas discharge lamp 38 or a voltage dependent resistor 37. These stabilizing methods, known by themselves reduce or remove power grid voltage fluctuations which are normally present in all common phase control systems and may occur amplified in the case of a circuit of FIG. 1 due to the resonant circuit 20.

It should be understood that these additional steps can also be applied in the same way to the exemplary embodiments according to FIGS. 3, 4, and 5.

We claim:

1. Electronic control and regulating system for a universal motor (5) employing phase control, comprising
   first and second input terminals (3, 4) connectable to a power grid supplying alternating current power at a predetermined power grid frequency;
   a bilaterally conducting controlled semiconductor switch (6) having a control electrode (7), the main current carrying path of said switch being connected with the motor (5) for controlling current flow at predetermined phase positions through the motor;
   a trigger circuit including a trigger capacitor (13) and a charge resistor (11; 40, 41) connected to the control electrode (7) of the semiconductor switch;
   an inductive current/voltage converter (9) having a current coil (8) serially connected with the motor (5) and the main current carrying path of said semiconductor switch (6) and having a voltage coil (10) inductively coupled to the current coil;
   a resonance circuit (20) including
   a resonance capacitor (21) connected to the voltage coil (10) of the current/voltage converter which has a resonant frequency of between 0.5 to 0.1 times said predetermined power grid frequency;
   and coupling/decoupling resistance means (14, 18; 30) connecting the resonance circuit to the trigger capacitor (13) and hence to the control electrode of the semiconductor switch to modify the charge on the trigger capacitor applied by the charge resistor (11; 40, 41) in dependence on the voltage of said resonance circuit and hence in dependence on load current, and hence modify the phase angle of triggering of the semiconductor switch in dependence on said load current.

2. System according to claim 1, wherein the resonant frequency of said resonance circuit (20) is in the vicinity of said predetermined power grid frequency.

3. System according to claim 1, wherein the charge resistor (11), the resonance circuit (20) and the trigger capacitor (13) are serially connected;
   and a resistor (28) connected in parallel across the resonance circuit and the trigger capacitor to form, with the charge resistor (11) a voltage divider applying a fractional voltage of the A-C power grid to the trigger capacitor (13), the voltage from the resonance circuit (20) being algebraically added to the partial voltage applied to said trigger capacitor (13).

4. System according to claim 1, wherein said coupling/decoupling resists connection means connecting the resonance circuit (20) to the trigger capacitor (13) comprises an adjustable resistor (30).

5. System according to claim 3, wherein said coupling/decoupling resistance connection means the resonance circuit (20) to the trigger capacitor (13) comprises a potentiometer (30) having its end terminals connected, respectively, to the junction between the charging resistor (11) and the resistor (28) connected in parallel to the resonance circuit and the charge capacitor, and its other main terminal connected to the charge capacitor (13), the tap or slider of the potentiometer being connected to the resonance circuit, for simultaneously changing the charging time constant of the trigger capacitor (13) and the damping factor of the resonance circuit (20).

6. System according to claim 1, including parallel capacitor means (25) and switching means (26) connected to switch the parallel capacitor means (25), selectively, in parallel circuit relationship with the trigger capacitor (13) to vary the time constant of the charge circuit.

7. System according to claim 1, including a damping resistor (24) and switching means connecting the damping resistor in parallel to the resonance circuit (20) to change the damping thereof.

8. System according to claim 6, including parallel capacitor means (25) and switching means (26) connected to switch the parallel capacitor means (25), selectively, in parallel circuit relationship with the trigger capacitor (13) to vary the time constant of the charge circuit;
   a damping resistor (24) and switching means connecting the damping resistor in parallel to the resonance circuit (20) to change the damping thereof;
   and wherein said switching means (26) simultaneously selectively place the damping resistor and the capacitor means in or out of circuit with the resonance circuit and the trigger capacitor, respectively.

9. System according to claim 8, wherein the a coupling/decoupling resistance means comprises an resistor (18), said resistor being connected between the connection of said damping resistor (24) and said capacitor means (25) and said trigger capacitor (13) to decouple the trigger capacitor and said capacitor means from the resonance circuit while providing for coupling of the resonant voltage from the resonance circuit (20) to the trigger capacitor.

10. System according to claim 1, wherein the charge resistor comprises two resistors (40, 41) serially connected by a common junction (42);
    and voltage stabilization means (36, 37, 38) connected to said junction (42) to provide for charging the trigger capacitor (13) at stabilized voltage level regardless of fluctuation in the power grid.

* * * * *

UNITED STATES PATENT AND TRADEMARK OFFICE
CERTIFICATE OF CORRECTION

PATENT NO. : 4,392,093
DATED : July 5, 1983
INVENTOR(S) : Kurt PAULE et al

It is certified that error appears in the above—identified patent and that said Letters Patent is hereby corrected as shown below:

Claim 4, line 2 (col. 6, line 6) change "resists" to -- resistance --,

Claim 5, line 2 (col. 6, line 10) delete "connection".

Claim 5, line 2, after "means" should be --connecting--.

Signed and Sealed this

Twenty-ninth Day of November 1983

[SEAL]

Attest:

GERALD J. MOSSINGHOFF

Attesting Officer

Commissioner of Patents and Trademarks